United States Patent Office 2,943,091
Patented June 28, 1960

2,943,091
PROCESS OF PREPARING HIGHER ALKYL-CYANOPYRIDINES

Francis E. Cislak, Indianapolis, Ind., assignor to Reilly Tar & Chemical Corporation, Indianapolis, Ind., a corporation of Indiana No Drawing. Filed July 20, 1959, Ser. No. 828,032

6 Claims. (Cl. 260—294.9)

This invention relates to a process of preparing higher alkyl-cyanopyridines. More specifically, it relates to a process of preparing alkyl-cyanopyridines having the structural formulae:

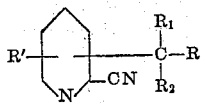

and

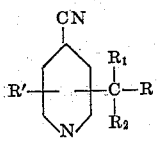

wherein R represents a lower alkyl group and R', $R_1$ and $R_2$ represent hydrogen or a lower alkyl group.

Cyanopyridines are important intermediates in the synthesis of a wide variety of pyridine compounds. The hydrolysis of 3-cyanopyridine to the vitamin nicotinamide is one of the better known commercial uses for a cyanopyridine. The conversion of 4-cyano-2-ethylpyridine to 2-ethyl-thioisonicotinamide, used in the treatment of tuberculosis, is another example of the commercial use of a cyanopyridine.

In 1948 Cislak and Wheeler (U.S. Patent 2,456,380) discovered that 3-cyanopyridine can be prepared in good yields by the vapor phase oxidation of nicotine. This discovery gave impetus to the preparation of the cyanopyridines by the vapor phase oxidation of the picolines in the presence of an amine or other source of ammonia.

The cyanopyridines, 2-cyanopyridine, 3-cyanopyridine, and 4-cyanopyridine are now commercially available chemicals.

The methyl-2-cyanopyridines may be prepared from the corresponding methyl-2-aminopyridines. While the yields are not too good, the commercial availability of the methyl-2-aminopyridines makes the process useful. The methyl-2-aminopyridine is converted to the corresponding methyl-2-bromopyridine and the latter by treatment with CuCN yields methyl-2-cyanopyridine:

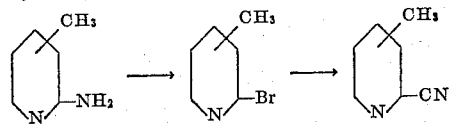

The above method is not suitable for the preparation of higher alkyl-2-cyanopyridines because of the difficulty of making the higher alkyl-2-aminopyridines.

I have found that I can prepare higher alkyl-2-cyanopyridines and higher alkyl-4-cyanopyridines in an efficient and economical manner by the interaction of an alkali metal cyanide with a quaternary salt of a higher alkylpyridine-N-oxide.

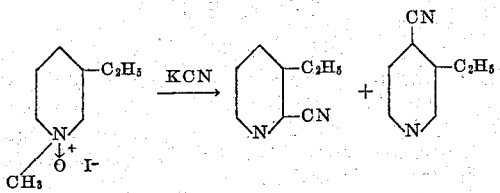

A convenient way of carrying out my invention is described in the following specific examples.

EXAMPLE 1

*2-ethyl-6-cyanopyridine and 2-ethyl-4-cyanopyridine*

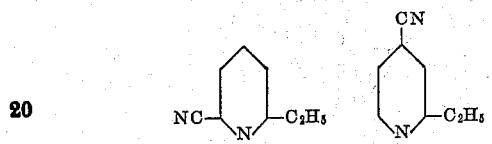

To an aqueous solution of one liter of water and 267 grams of the methyl iodide quaternary salt of 2-ethylpyridine-N-oxide there is added 70 grams of KCN. The mixture is stirred at room temperature for about three hours and then the temperature of the solution is gradually raised to about 50° C., and the stirring is continued for another three hours. The solution is then cooled to room temperature. The 2-ethyl-4-cyanopyridine and the 2-ethyl-6-cyanopyridine formed during the reaction period are separated from the aqueous solution by extraction with chloroform. The two isomers are separated from each other by fractional distillation under high vacuum. The 2-ethyl-6-cyanopyridine predominates.

In place of using water as a solvent and reaction medium, I may use other solvents, such for example, as dioxane. And in place of the KCN I may use other cyanides, as for example, NaCN. In place of the methyl iodide quaternary salt I may use other alkyl quaternary salts.

EXAMPLE 2

*2-butyl-4-cyanopyridine and 2-butyl-6-cyanopyridine*

The procedure of Example 1 is repeated with the exception that a methyl bromide quaternary salt of the N-oxide of 2-butylpyridine is used in place of the methyl iodide quaternary salt of 2-ethylpyridine-N-oxide.

EXAMPLE 3

*3-ethyl-4-cyanopyridine and 3-ethyl-2-cyanopyridine*

The procedure of Example 1 is repeated with the exception that the methyl iodide quaternary salt of 3-ethylpyridine-N-oxide is used in place of the quaternary methyl iodide of 2-ethylpyridine-N-oxide.

EXAMPLE 4

*4-ethyl-2-cyanopyridine*

The procedure of Example 1 is repeated with the exception that the methyl iodide quaternary salt of 4-ethylpyridine-N-oxide is used in place of the quaternary methyl iodide of 2-ethylpyridine-N-oxide.

EXAMPLE 5

*2-methyl-5-ethyl-6-cyanopyridine*

The procedure of Example 1 is repeated with the exception that the methyl iodide quaternary salt of 2-methyl-5- ethylpyridine-N-oxide is used in place of the methyl iodide quaternary salt of 2-ethylpyridine-N-oxide.

EXAMPLE 6

*4-(5-nonyl)-2-cyanopyridine*

The procedure of Example 1 is repeated with the exception that the metho-sulfate quaternary salt of 4-(5-nonyl)pyridine-N-oxide is used in place of the methyl iodide quaternary salt of 2-ethylpyridine-N-oxide.

EXAMPLE 7

*4-t-butyl-2-cyanopyridine*

The procedure of Example 1 is repeated with the exception that the methyl chloride quaternary salt of 4-t-butylpyridine-N-oxide is used in place of the methyl iodide quaternary salt of 2-ethylpyridine-N-oxide.

I claim as my invention:

1. The process of preparing higher alkyl 2-cyanopyridines and higher alkyl 4-cyanopyridines which compounds have the structural formulae:

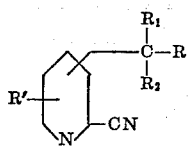

and

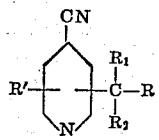

wherein R represents a lower alkyl group and R', $R_1$ and $R_2$ are selected from the group consisting of hydrogen and lower alkyl which comprises reacting an alkali metal cyanide with a solution of a quaternary salt of an alkylpyridine-N-oxide of the formula:

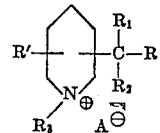

wherein R, R', $R_1$ and $R_2$ have the same meaning as given above, $R_3$ represents a lower alkyl group and A represents an anion selected from the group consisting of halides and sulfates.

2. The process of preparing 2-ethyl-4-cyanopyridine and 2-ethyl-6-cyanopyridine which comprises reacting an alkali metal cyanide with an aqueous solution of the alkylpyridine-N-oxide quaternary salt of claim 1 in which R is methyl and R', $R_1$, and $R_2$ are hydrogen.

3. The process of claim 1 wherein the quaternary salt used is the methyl halide of 4-ethylpyridine-N-oxide.

4. The process of claim 1 wherein the quaternary salt used is the methyl halide of 3-ethylpyridine-N-oxide.

5. The process of claim 1 wherein the quaternary salt used is the methosulfate of 2-butylpyridine-N-oxide.

6. The process of preparing 2-methyl-5-ethyl-6-cyanopyridine which comprises reacting an alkali metal cyanide with an aqueous solution of the quaternary salt of claim 1 in which the group $$-\underset{R_2}{\overset{R_1}{C}}R$$

is 5-ethyl, and R' is 2-methyl.

No references cited.